March 1, 1960  R. H. D. CHAMBERLIN  2,926,732
CONTROL APPARATUS FOR HELICOPTER POWER UNITS
Filed Feb. 11, 1955  2 Sheets-Sheet 1
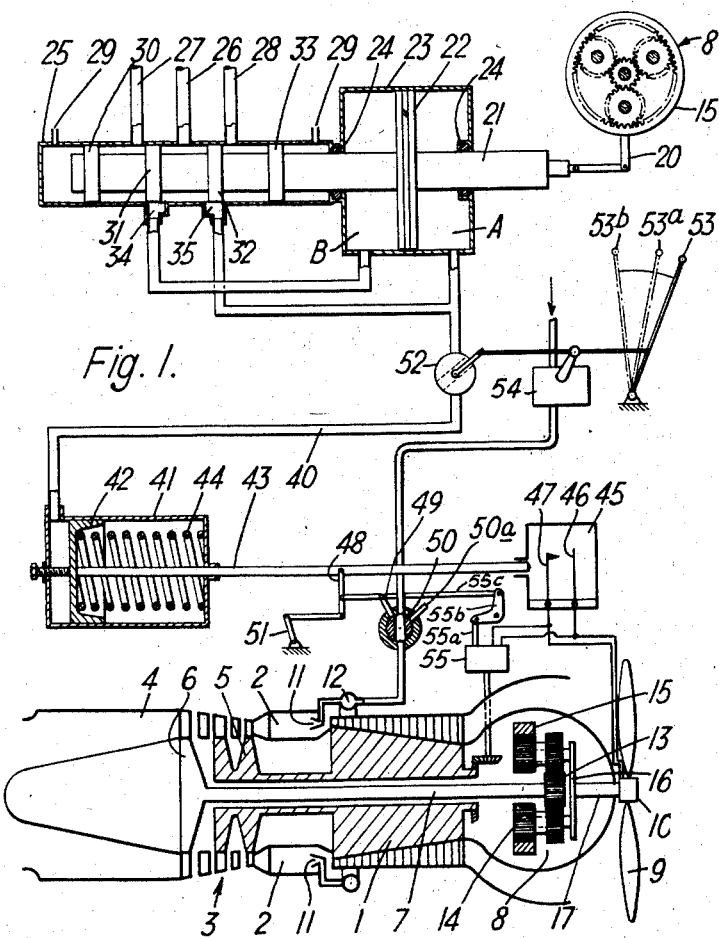
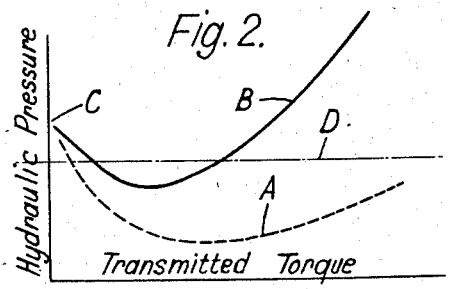
Inventor
Reginald H. D. Chamberlin March 1, 1960   R. H. D. CHAMBERLIN   2,926,732
CONTROL APPARATUS FOR HELICOPTER POWER UNITS
Filed Feb. 11, 1955   2 Sheets-Sheet 2

Inventor
Reginald H.D. Chamberlin
By Watson, Cole,
Grindle & Watson
Attorneys

United States Patent Office 2,926,732
Patented Mar. 1, 1960

2,926,732

CONTROL APPARATUS FOR HELICOPTER POWER UNITS

Reginald Henry Douglas Chamberlin, Ealing, London, England, assignor to D. Napier & Son Limited, London, England, a company of Great Britain Application February 11, 1955, Serial No. 487,661

Claims priority, application Great Britain February 16, 1954

10 Claims. (Cl. 170—135.22)

This invention relates to control apparatus for power units of the internal combustion type, that is to say of the type including a combustion turbine or reciprocating internal combustion engine, a substantial part at least of the power of which is transmitted through transmission mechanism, and in which the power out-put is normally controlled by controlling the supply of fuel to one or more combustion chambers. The invention is particularly but not exclusively applicable to power units for aircraft propulsion, especially those incorporating a combustion turbine, and is concerned with such power units in which there is associated with the transmission mechanism, apparatus responsive to the torque being transmitted therethrough.

An object of the invention is to reduce the risk or extent of damage which such power units may suffer in the event of failure of certain parts thereof during operation, and correspondingly to reduce the danger to life and of damage to the aircraft or other structure or equipment in or adjacent to which the power unit is installed.

According to one aspect of the present invention control apparatus for a power unit of the internal combustion type including transmission mechanism through which a substantial part at least of the power developed by the unit is transmitted and having associated with it mechanism responsive to the torque transmitted through such transmission mechanism, and means for normal control of the power unit by controlling the supply of fuel to the combustion chamber or chambers thereof, includes means whereby, if with the normal fuel control means in a position corresponding to a normal transmission of substantial torque through the transmission mechanism, the torque drops substantially or to zero or is reversed in direction, the fuel supply is automatically and substantially immediately reduced or cut off.

Thus, if during normal operation there is an abnormal fall in torque, for example to zero, or a reversal of torque, due to the fracture of some part or to some other cause, the fuel supply is automatically and substantially immediately reduced or cut off and the risk of further damage to the unit or nearby structure or equipment and danger to life is thus reduced.

According to another aspect of the invention control apparatus for a power unit of the kind referred to comprises torque responsive mechanism associated with the transmission mechanism and arranged to give an indication when the torque transmitted falls below a predetermined value in the normal direction of torque transmission, main control means for the power unit arranged to control the power output thereof by varying the supply of fuel to the combustion chambers and including a master control member whose setting determines the normal power output of the power unit, an emergency fuel control and an interconnection between the torque responsive mechanism and the emergency fuel control arranged at least to reduce substantially or completely shut-off the supply of fuel to the combustion chambers immediately when the transmitted torque falls below the predetermined value, and an override device associated with the master control member and arranged to render the emergency fuel supply control inoperative when the setting of the master control member corresponds to a normal power output which is less than a predetermined value.

The invention is also particularly applicable to aircraft power units for jet helicopters, of the type comprising a combustion turbine and a propeller (for normal forward propulsion) transmission mechanism through which part of the power developed by the combustion turbine is transmitted to the propeller, an auxiliary compressor also driven by the combustion turbine, and arranged to deliver compressed air to the helicopter rotor head where fuel may be burnt in rotor tip burners, or into the exhaust duct from the turbine. In such case the control apparatus is conveniently arranged to reduce the supply of fuel to the combustion chambers to a value just sufficient to drive the auxiliary compressor to permit the helicopter to make an emergency landing.

In any case the invention is particularly applicable to power units in which the transmission mechanism comprises differential gearing having input and output members and a third reaction member rotation of which is resisted by liquid pressure in one or more chambers constituting part of hydraulic torque-responsive apparatus, and including means sensitive to the pressure conditions in these chambers and arranged to effect the required reduction of fuel when the pressure conditions correspond to a value of transmitted torque which is less than the predetermined value.

Thus where the hydraulic torque responsive apparatus is constructed and arranged so that under normal conditions the torque is resisted by the maintenance of an appropriate difference between pressures acting on the reaction element or a member connected to it respectively in opposite directions, the means for reducing or cutting off the fuel supply might be arranged to be operated by an abnormal pressure difference.

In a power unit embodying torque responsive apparatus as described in the specification of the present applicant's United States application No. 411,957, now U.S. Patent No. 2,715,834, however, the arrangement may be such that while the torque on the reaction element is resisted by the maintenance of an appropriate pressure difference in hydraulic chambers, the pressures in which act respectively in opposite directions on the reaction element, both pressures change according to predetermined laws with rises in torque and in this case, therefore, it is possible to arrange the means for reducing or cutting off the fuel supply so as to be operated to reduce or cut off the supply when one only of the pressures acquires some abnormal value.

For example in torque responsive apparatus as described in the specification of United States Patent No. 2,715,834 the pressure in the chambers in which during normal operation the lower hydraulic pressure is maintained may be substantial at zero torque and may, with increases in torque from zero, fall comparatively rapidly below a value above which it does not again rise over the remainder of the torque range of the power unit. In such a case it is possible to arrange for the means for reducing or cutting off the fuel supply on the occurrence of abnormal conditions to be operated when, with the normal fuel control set for normal power operation, the lower hydraulic pressure referred to rises above the value mentioned.

The invention may be performed in various different ways but one specific embodiment will now be described by way of example with reference to the accompanying drawings in which—

Figure 1 is a diagrammatic sectional illustration of a turbo-propeller aircraft power plant including control apparatus according to the invention.

Figure 2 is a graph showing variations in hydraulic pressure with variations in torque.

Figure 3:
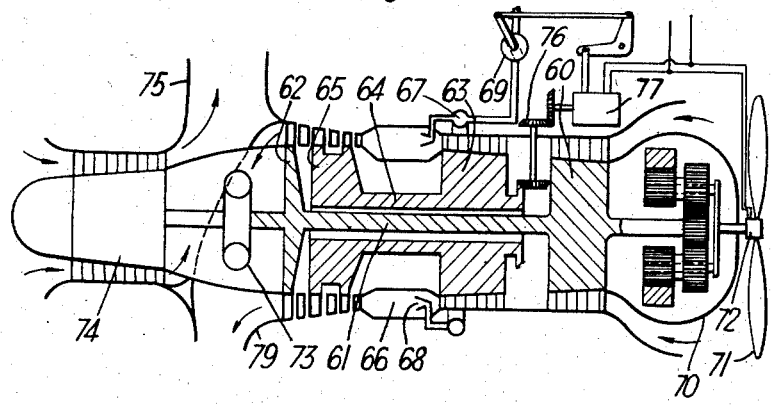
Figures 3 and 4 are diagrammatic illustrations of combined gas producers with turbo-propeller power plants suitable for use in reaction jet helicopters.

In the first example the power plant is of the free turbine type and comprises an axial flow compressor 1, a series of combustion chambers 2 and a turbine indicated generally at 3 exhausting into a nozzle 4 from which the exhaust gases issue as a reaction jet. The turbine is of the three stage type, the first two stages being mounted on a first turbine rotor 5 which is connected to the rotor of the compressor 1. The last stage of the turbine is mounted on a second turbine rotor 6 which is connected by a shaft 7 and a differential reduction gear indicated generally at 8 to a propeller 9. The propeller is of the variable pitch type and includes pitch control mechanism indicated generally at 10 which may be of any well known type. Fuel is admitted to the combustion chambers 2 through a series of burners 11 which are shown diagrammatically as being connected to a ring main 12.

The reduction gear 8 includes a sun pinion 13 mounted on the shaft 7, a series of double planet assemblies 14 meshing with the sun pinion 13 and with an internally toothed annulus pinion 15, these planet assemblies being mounted on a spider 16 which is connected to a shaft 17 on which the propeller 9 is mounted.

The reduction gear 8 is also for convenience illustrated in section at the upper part of Figure 1. The annulus ring 15 which constitutes the reaction member of the gear is rigidly connected to an arm 20 which is pivotally connected to a combined valve and ram piston rod 21. The rod 21 has formed thereon a double acting ram piston 22 lying in a ram chamber 23, the chamber being provided with sealing glands 24 at either end through which the rod passes. The remote end of the rod 21 extends into a valve chamber 25 provided with an inlet port 26 through which hydraulic fluid is delivered under relatively high pressure and outlet ports 27 and 28 lying on either side thereof. The opposite ends of the valve chamber are vented to relief through ports 29. The part of the rod 21 within the valve chamber 25 is provided with four spaced lands 30, 31, 32, 33, and the valve chamber is also provided with fluid control ports 34 and 35 connected respectively to the opposite ends of the ram chamber 23.

The arrangement and dimensions of the lands 31, 32 and the ports 34 and 35 are such that with the mechanism in the "no torque" position as shown in Figure 1 both ports 34 and 35 are just open to the pressure supply port 26. Equal pressures of relatively low value are thus provided in the two compartments A and B of the ram chamber end and the piston 22 and hence the rod 21 remain stationary. As the torque transmitted through the reduction gear 8 increases the annulus ring 15 tends to move and the consequent movement of the rod 21 tends to open one of the ports 34 and 35 further. Since the width of the lands 31 and 32 is rather less than the width of the ports 34 and 35 the effective opening of the other port is not initially reduced until the land has moved to the opposite side of the port. Moreover there will be a certain leakage past the ram piston 22 between the compartments A and B of the ram chamber and as a result the pressures on both sides of this piston will tend to fall, through the pressure in compartment A will become progressively smaller than the pressure in compartment B, as shown in Figure 2. The resultant pressure difference acting on the ram piston 22 acts to hold the rod 21 and thus the annular ring 15 steady.

The compartment A is connected through a conduit 40 to a servo ram chamber 41 containing a servo piston 42 attached to an operating rod 43. One side of the piston 42 is subject to the pressure in the conduit 40 while the other end is acted upon by a spring 44 within the chamber. The rod 43 extends through a gland in this end of the chamber and its remote end is connected to an electrical contact device indicated generally at 45 arranged so that movements of the rod to compress the spring 44 will close a pair of electrical contacts 46 and 47. These contacts are arranged in an electrical circuit associated with the pitch control mechanism 10 of the propeller 9, which acts to "feather" the propeller when the contacts 46 and 47 are closed to prevent the propeller "windmilling."

The mid point of the operating rod 43 is pivotally connected to one end of a link 48 the mid point of which is connected to the control arm 49 of a fuel control valve 50 arranged in the fuel supply line to the burners 11. The opposite end of the link 48 is connected to a manual control lever 51. It will be seen therefore that movements of the rod 43 to the right, that is to say in a direction to compress the spring 44, will close the contacts 46, 47 and will also operate the fuel control valve 50 to reduce or shut off the supply of fuel from the fuel supply line to the fuel ring main 12 and burners 11. The valve 50 may also be operated manually by means of the lever 51.

The valve 50 may also if desired be arranged to act as a "dump valve," in which case it will automatically connect the ring main 12 to relief or drain outlet 50a at the same time as shutting off the supply of fuel, so as to drain off any fuel remaining in the ring main.

An override control valve 52 is also arranged in the conduit 40 between the compartment A and the servo cylinder 41 and is connected to the pilot's main power control lever 53 in order to prevent the control apparatus coming into operation to shut off the fuel supply when the power lever 53 is set at low power positions, for example at starting. The power lever 53 adjusts the setting of a main fuel control 54. With the main power lever lying between the positions 53 and 53a the valve 52 is closed, but when the power lever is moved in a direction to increase the power towards the full power position, the valve 52 opens and thereafter the control apparatus is in operation and will come into action upon the predetermined low torque conditions.

The graph shown in Figure 2 represents variations in the pressures in the compartments A and B corresponding to variations in the torque transmitted by the gear 8. It will be seen that at zero torque conditions the pressure C in A and B are both equal, and that as the torque increases both pressures initially fall, though the pressure in A falls to a greater extent than that in B. The pressure in compartment B tends to rise again as torque increases, and the pressure in compartment A also rises slowly as the value of the transmitted torque increases towards a maximum, but over the whole operating range of the engine the pressure in compartment A is always below the initial pressure C which exists at no torque conditions. By designing the apparatus appropriately therefore, the apparatus may be made to operate only when the pressure in compartment A rises above a pressure such as D, which is less than the pressure C. This will only occur when the torque falls below a predetermined low value.

It will be realised that the apparatus will also come into operation if the direction of torque is reversed, such as might happen for example by reason of a failure in the turbine itself or a failure in the transmission between the turbine and the reduction gear 8, in which case the propeller 9 would "wind mill" and tend to drive the turbine through the reduction gear.

For controlling the valve 50, the governor 55 may be linked to the valve 50 in substantially the manner disclosed in the U.S. patent to Gardner et al. 2,153,921 of April 11, 1939. To this end and as diagrammatically illustrated in Fig. 1, the speed responsive governor element 55a is projected from the governor responsive to increase in speed of the turbine beyond a predetermined speed and its movement is transmitted through the bell crank lever 55b and link 55c to valve control arm 49. It will thus be seen that projection of the element 55a as the turbine surpasses the predetermined speed will act through the lever 55b and link 55c to rotate the valve in a clockwise direction as seen in Fig. 1 to a position wherein it shuts off the fuel supply and places the ring main 12 in communication with the relief outlet 50a.

Figure 4:
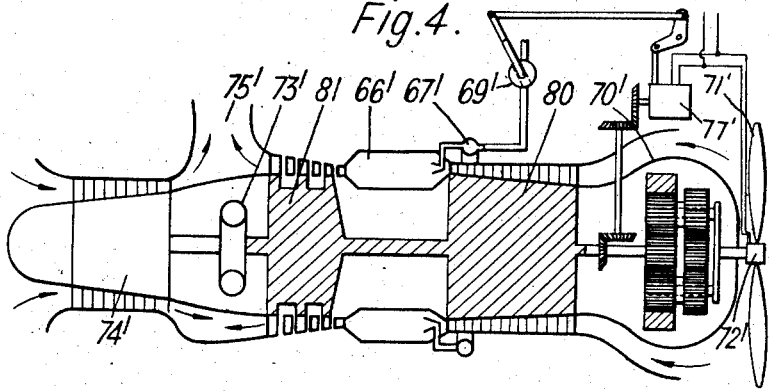

The two alternative forms of power plant illustrated in Figures 3 and 4 both comprise a gas turbine installation of the turbo-propeller type, and include also an auxiliary compressor arranged at the rear of and driven by the turbine. In the construction illustrated in Figure 3 the auxiliary compressor is arranged to supply compressed air to the helicopter rotor, where fuel will be burnt with the air in rotor tip burners arranged at the tips of the rotor blades. The resultant power gas issues in the forms of reaction jets through nozzles at the tips of the blades to provide lift, while the propeller at the forward end of the power plant is used for normal forward propulsion. The form and construction of the helicopter rotor forms no part of the present invention and will not therefore be described in detail.

In the construction illustrated in Figure 3, the gas turbine is of the two-spool type, and comprises a first stage compressor 60, coupled through a shaft 61 to a second stage turbine rotor 62, and a second stage compressor 63 coupled through a hollow shaft 64 surrounding the shaft 61, to a first stage turbine rotor 65. A series of combustion chambers 66 are arranged between the compressor and turbine, and fuel is admitted to these chambers through a ring main 67 and burners 68 by way of a valve 69 which corresponds to the valve 50 in Figure 1. The forward end of the first stage compressor 60 is connected through an epicyclic reduction gear, indicated generally by the reference 70, to a variable pitch propeller 71 including pitch control mechanism 72, and the reduction gear 70 is constructed and arranged as in the example illustrated in Figure 1, including hydraulic control circuits arranged to actuate the valve 69 and the pitch control mechanism 72 automaticaly when the torque transmitted by the gear falls below a predetermined value.

The rear end of the second stage turbine rotor 62 is connected through a hydrauic couping 73 to an auxiiary compressor 74 arranged behind the turbine, and the air delivered by this compressor is conducted to a duct 75, from which it is led to the helicopter rotor as referred to above. The exhaust from the turbine is exhausted to the atmosphere through a duct 79.

It will be understood that when applied to a helicopter it may be undesirable to reduce the supply of fuel to zero, if the torque transmitted by the gear 70 should fall, since the supply of power gas to the helicopter rotor constitutes the sole means of obtaining "lift." Preferably therefore in this case the valve 69 is arranged only to reduce the supply of fuel to a value which will provide sufficient power gas to enable the helicopter to land.

Moreover in this case also as in Figure 1 the power plant includes a free turbine unconnected to an external power absorber, and consequently out of the direct control of the torque responsive mechanism, and it is desirable to provide some additional means of controlling the speed thereof. Thus in the construction illustrated in Figure 3 it will be seen that the spool assembly including the second stage compressor 63 and first stage turbine rotor 65 is not connected to any external power absorber, and this assembly is accordingly connected through a gear train 76 to a turbine overspeed governor 77 which is arranged to come into operation if the speed of this spool assembly should exceed a predetermined value. The governor 77 is arranged to actuate the fuel valve 69 and the propeller pitch control mechanism 72 as in the arrangement illustrated in Figure 1.

The further alternative construction illustrated in Figure 4 is basically similar to that shown in Figure 3, and corresponding parts are indicated by the same reference numerals with suffixes. In this case however the gas turbine unit is of the single-spool type, and comprises a single compressor 80 coupled to a turbine 81, this turbo compressor assembly being arranged to drive both the propeller 72' and the auxiliary compressor 74'. Moreover in this case the compressor 74', together with the exhaust from the turbine 81, are both delivered to the duct 75' leading to the helicopter rotor head. The control apparatus is arranged, as in the construction of Figure 3, to reduce the fuel supply to a value sufficient to drive the auxiliary compressor, so as to permit the helicopter to effect an emergency landing, if the torque transmission through the gear 70' falls below the predetermined value.

It will be apparent that the present invention will serve to prevent overspeeding or the continued operation of a power unit of the kind referred to in the event of failure of the transmission mechanism or other failure resulting in the elimination or a substantial abnormal reduction of torque when the normal controls are set for load running.

Moreover, when the power unit is for aircraft propulsion and the transmission mechanism drives a propeller, the means which cuts off the fuel supply may also act to cause feathering of the propeller to prevent "windmilling" thereof.

It will be understood that the invention is applicable to power units of the kind referred to of all types, including combustion turbine power units of the free turbine or other types, and irrespective of the type of transmission mechanism.

What I claim as my invention and desire to secure by Letters Patent is:

1. Control apparatus for a power unit of the internal combustion type including transmission mechanism through which a substantial part at least of the power developed by the unit is transmitted, comprising torque responsive mechanism associated with the transmission mechanism and arranged to give an indication when the torque transmitted falls below a predetermined value in the normal direction of torque transmission, main control means for the power unit arranged to control the power output thereof by varying the supply of fuel to the combustion chambers and including a master control member whose setting determines the normal power output of the power unit, an emergency fuel control and an interconnection between the torque responsive mechanism and the emergency fuel control arranged at least to reduce substantially or completely shut-off the supply of fuel to the combustion chambers immediately when the transmitted torque falls below the predetermined value, an override device operated by the master control member and acting on the emergency fuel supply control and arranged to render the emergency fuel supply control inoperative when the setting of the master control member corresponds to a normal power output which is less than a predetermined value, and an overspeed governor responsive to the speed of rotation of the power unit, and an interconnection between such governor and the emergency fuel control, at least to reduce substantially the supply of fuel to the combustion chambers, if the speed of rotation exceeds a predetermined value.

2. Control apparatus as claimed in claim 1 in which the transmission mechanism comprises differential gearing including input and output members and a third reaction member, rotation of which is resisted by liquid pressure in at least one chamber constituting part of said torque responsive apparatus, and including means sensitive to the pressure conditions in this chamber and acting on said emergency fuel control.

3. Control apparatus as claimed in claim 2 in which the hydraulic torque responsive apparatus comprises at least two chambers the pressures in which act in opposite directions on the reaction member of the differential gear, the arrangement being such that both pressures change in value according to predetermined laws with changes in torque transmitted, and in which the pressure sensitive device is associated with one of such chambers and is arranged to effect the required reduction of fuel when the pressure in this chamber reaches a predetermined value.

4. Control apparatus as claimed in claim 3 in which the law relating the change in pressure in one of the chambers to changes in torque is such that the pressure in this chamber is relatively high at all values of transmitted torque below a predetermined low value in the normal direction of torque transmission, while the pressure in this chamber falls rapidly below and remains below a relatively low pressure for all values of torque above this relatively low value in the normal direction of torque transmission, and in which the mechanism sensitive to the pressure in the chamber is arranged to operate automatically to effect the required reduction of fuel when the pressure in this chamber reaches or exceeds a predetermined pressure value which is not greater than the relatively low pressure referred to.

5. Control apparatus for a power unit as claimed in claim 1 in which the means for reducing the fuel supply to the combustion chamber include means for draining the fuel supply line adjacent the combustion chamber.

6. Control apparatus for an aircraft power unit of the internal combustion type comprising a combustion turbine and a propeller, transmission mechanism through which part of the power developed by the combustion turbine is transmitted to the propeller, and an auxiliary compressor also driven by the combustion turbine, and arranged to deliver compressed air to provide power for driving a helicopter rotor head, said control apparatus comprising torque responsive mechanism associated with the transmission mechanism and arranged to give an indication when the torque transmitted falls below a predetermined value in the normal direction of torque transmission, main control means for the power unit arranged to control the power output thereof by varying the supply of fuel to the combustion chambers and including a master control member whose setting determines the normal power output of the power unit, an emergency fuel control and an interconnection between the torque responsive mechanism and the emergency fuel control arranged to reduce substantially the supply of fuel to the combustion chambers immediately when the transmitted torque falls below the predetermined value, an override device operated by the master control member and acting on the emergency fuel control to render the emergency fuel supply control inoperative when the setting of the master control member corresponds to a normal power output which is less than a predetermined value, and an overspeed governor responsive to the speed of rotation of the power unit, and an inter-connection between such governor and the emergency fuel control, at least to reduce substantially the supply of fuel to the combustion chambers, if the speed of rotation exceeds a predetermined value.

7. Control apparatus for a power unit as claimed in claim 6 in which the transmission mechanism comprises differential gearing including input and output members and a third reaction member, rotation of which is resisted by liquid pressure in at least one chamber constituting part of said torque responsive apparatus, and including means sensitive to the pressure conditions in these chambers and acting on said emergency fuel control.

8. Control apparatus for a power unit as claimed in claim 7, in which the hydraulic torque responsive apparatus comprises at least two chambers the pressures in which act in opposite directions on the reaction member of the differential gear, the arrangement being such that both pressures change in value according to predetermined laws with changes in torque transmitted, and in which the pressure sensitive device is associated with one of such chambers and is arranged to effect the required reduction of fuel when the pressure in this chamber reaches a predetermined value.

9. Control apparatus for a power unit as claimed in claim 8, in which the law relating the change in pressure in one of the chambers to changes in torque is such that the pressure in this chamber is relatively high at all values of transmitted torque below a predetermined low value in the normal direction of torque transmission, while the pressure in this chamber falls rapidly below and remains below the relatively low pressure for all values of torque above this relatively low value in the normal direction of torque transmission, and in which the mechanism sensitive to the pressure in the chamber is arranged to operate automatically to effect the required reduction of fuel when the pressure in this chamber reaches or exceeds a predetermined pressure value which is not greater than the relatively low pressure referred to.

10. Control apparatus for a power unit as claimed in claim 6, in which the means for reducing the fuel supply to the combustion chamber include means for draining the fuel supply line adjacent the combustion chamber.

References Cited in the file of this patent

UNITED STATES PATENTS

| | | |
|---|---|---|
| 2,595,345 | Engelhardt et al. | May 6, 1952 |
| 2,609,656 | Poole | Sept. 9, 1952 |
| 2,667,228 | Wood et al. | Jan. 26, 1954 |